July 9, 1929.  C. G. HALL  1,719,931
MACHINE FOR MAKING CONFECTIONS AND THE LIKE
Filed May 20, 1924  3 Sheets-Sheet 1
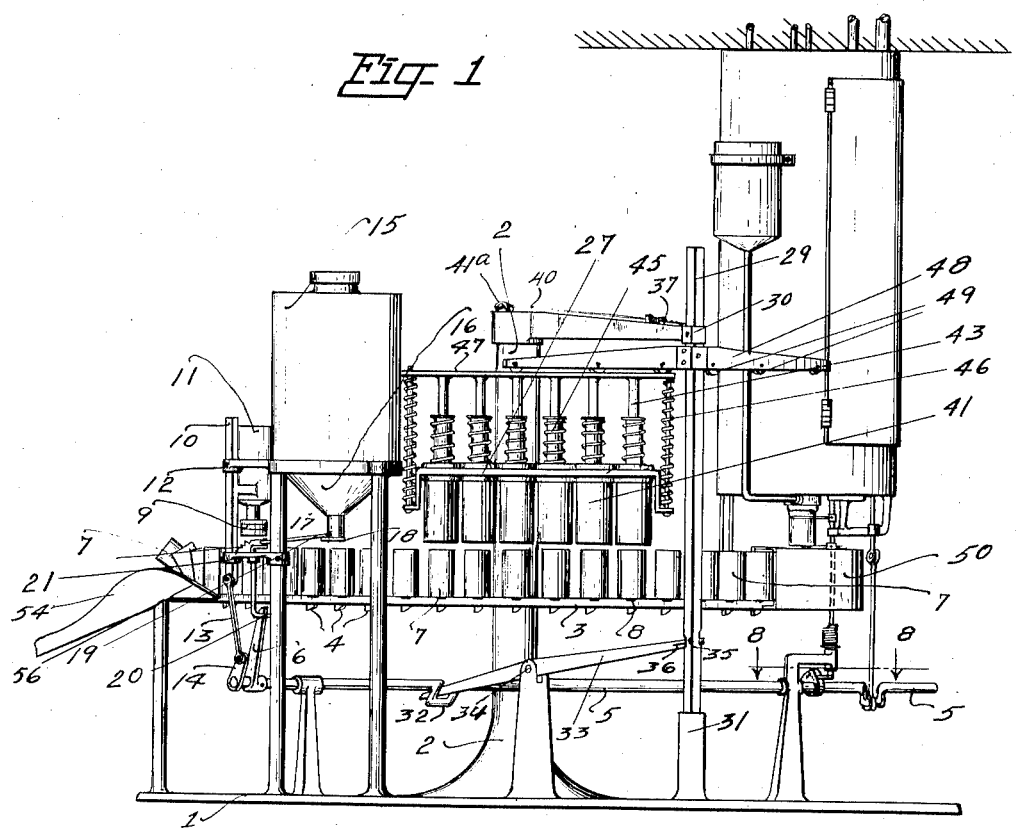
Fig. 1
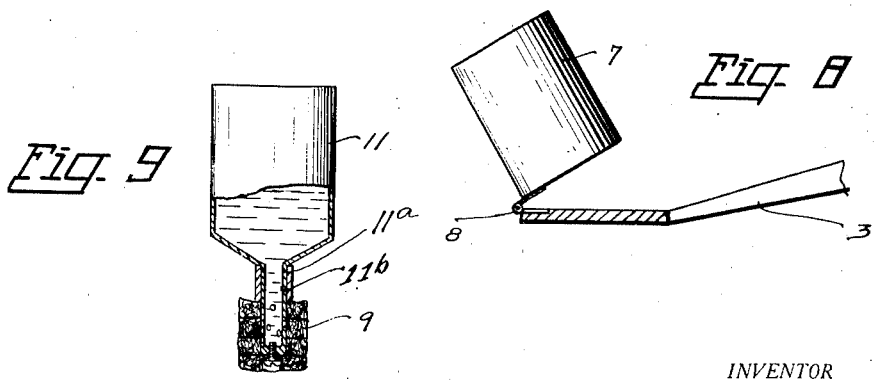
Fig. 9
Fig. 8
INVENTOR
Charles G. Hall
BY
ATTORNEY

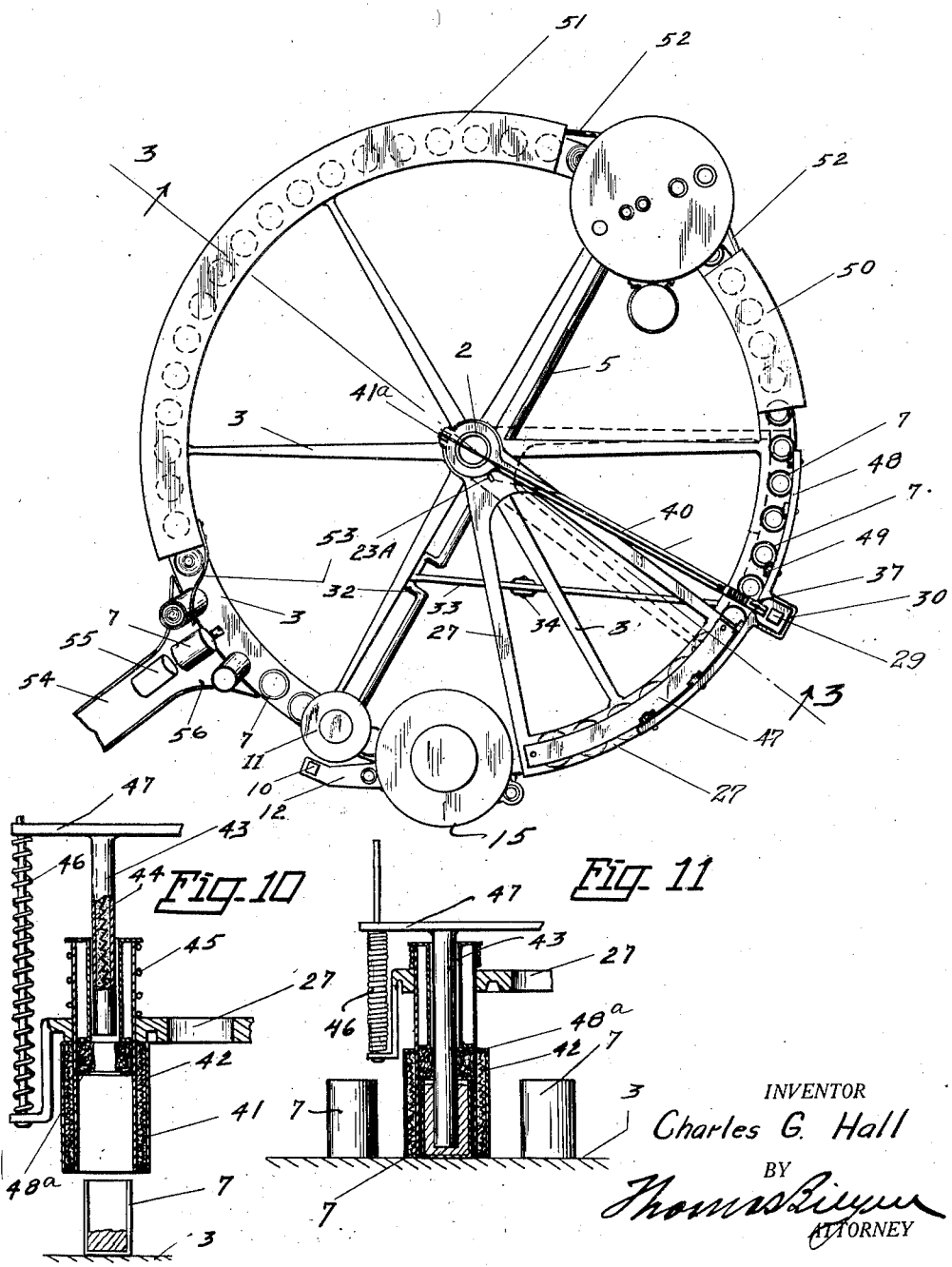

July 9, 1929.  C. G. HALL  1,719,931
MACHINE FOR MAKING CONFECTIONS AND THE LIKE
Filed May 20, 1924  3 Sheets-Sheet 3
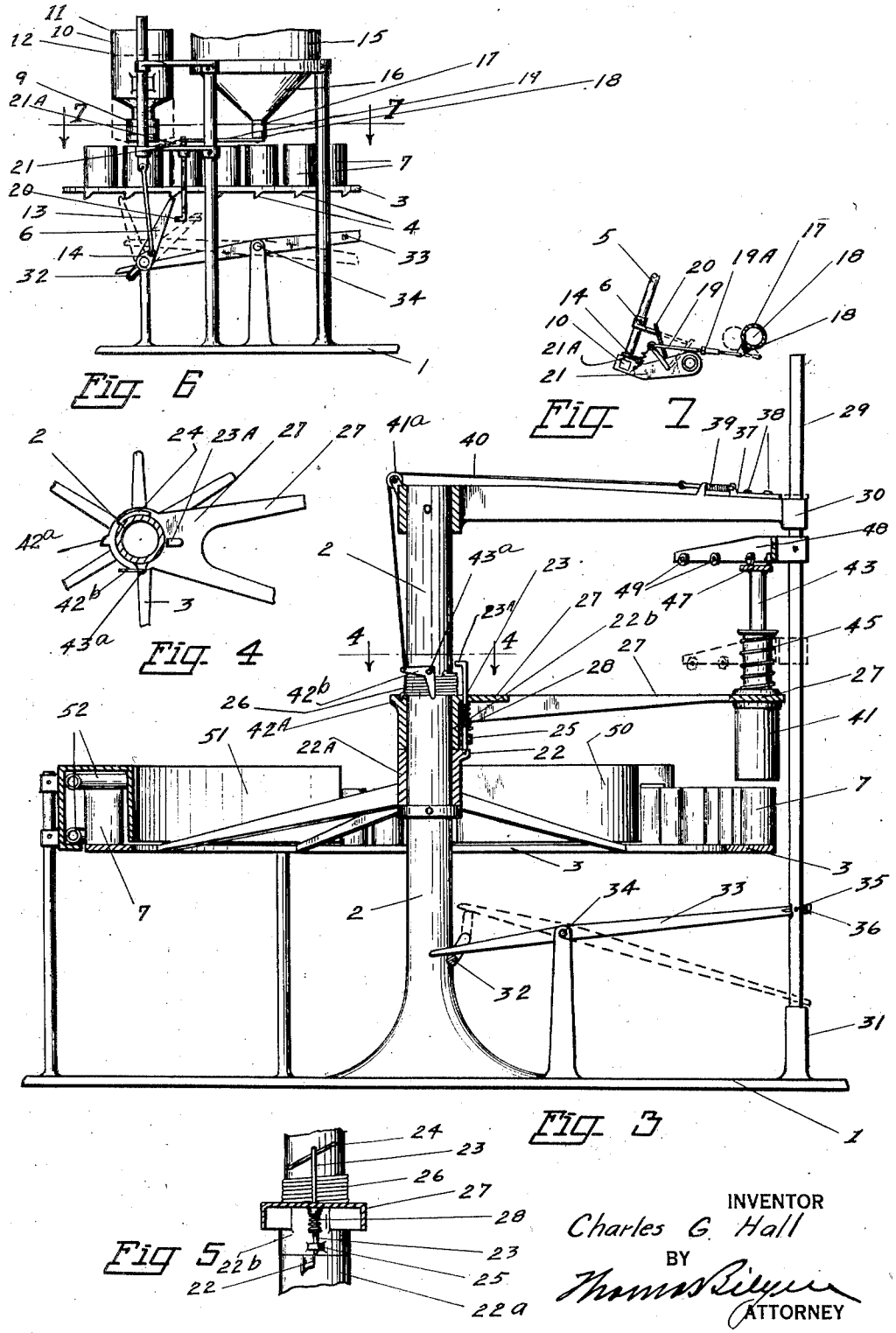
INVENTOR
Charles G. Hall
BY
Thomas Bilyeu
ATTORNEY Patented July 9, 1929.

1,719,931

UNITED STATES PATENT OFFICE.

CHARLES G. HALL, OF PORTLAND, OREGON, ASSIGNOR TO NOVELTY FOOD CORPORATION, OF BOISE, IDAHO, A CORPORATION OF IDAHO.

MACHINE FOR MAKING CONFECTIONS AND THE LIKE.

Application filed May 20, 1924. Serial No. 714,598.

My invention is intended for the making of confections which consists of a confection container, to be baked from an edible material requiring baking and made of dough like material. The baking is done in cup like containers, hinged at the lower edge and which are mounted in series upon a horizontal circular table adapted to being driven and stopped in timed relationship. The dough like material is deposited a uniform amount in each cup container and is then baked in position about a heated core, the baked container is then cooled and filled with the confection filling material, and, since it may be necessary to fill a part of the baked container with frozen filler, provision is made for the cooling of the filled containers after the same are filled.

The filled containers are tipped about the hinged side to permit of their removal from the containers after cooling. To prevent the baked containers from sticking, or clinging, to the inner surfaces of the cup like containers in which they are baked, each of them are coated with edible fat before the deposit of the dough therein.

I attain these objects by the mechanism illustrated in the accompanying drawings, in which—

Fig. 1 is a side elevation of the assembled machine.

Fig. 2 is a plan view.

Fig. 3 is a section view taken on line 3—3 of Fig. 2 looking in the direction indicated by the arrows.

Fig. 4 is a section view taken on line 4—4 of Fig. 3.

Fig. 5 is a fragmentary sectional side elevation of the lifting mechanism.

Fig. 6 is a fragmentary side elevation of the mechanism for applying the fat to the baking containers and for depositing the dough in the same after the fat is applied.

Fig. 7 is a section view taken on line 7—7 of Fig. 6 looking in the direction indicated by the arrows.

Fig. 8 shows an end elevation of the cup like container in partially tipped position.

Fig. 9 is a partial sectional view of the container and the swab like member for applying the edible fat to the inner surfaces of the cup like containers.

Fig. 10 is a sectional view of the heating elements for supplying the heat for baking, the same is here shown as inoperative and removed from the position of baking.

Fig. 11 is a sectional view of the mechanism shown in Fig. 10 but in position for baking.

Like reference characters refer to like parts throughout the several views.

1 is the base and 2 is a column attached thereto which is the support for maintaining the working parts of my machine in supported relationship with each other. 3 is the endless horizontal cylindrical working table rotatably journaled on the column, and is rotated thereabout by action of arm 6, which is secured to the rotatable shaft 5, contacting with the lugs 4, disposed on the under side of the table.

Attached to the upper surface and in hinged relationship thereto, are the cup like containers 7, each having a bottom which is hinged to the table 3, by the hinge 8. These cups 7 are normally in vertical position; and have the upper end open for the reception of the swab member 9, which is attached to and surrounds the reduced portion $11^a$ of the hollow vessel member 11, containing the liquid fat. This vessel has a series of openings $11^b$ leading from the interior of the vessel to the swab which maintain the swab saturated with fat. The vessel and swab are secured to the guide 10 which operates within the guideways 12. An up and down motion is imparted to the swab, and the vessel through the action of the crank 14, which is secured to the shaft 5, and the link member 13. Upon each cycle of operation, the swab enters the cup like containers and coats the inner surface of the same with fat.

The dough material is placed in the hopper 15, which has sloping bottom sides 16, terminating in a cylindrical restricted opening 17, having a cut off valve 18, working across the same and which measures a predetermined amount of dough from the hopper at each cycle of its operation. The cut off valve is operated through the action of the link 19, which has a take up length control 19ª, and the crank 20 journaled within the arm 21. The arm 6 attached to the shaft 5 engages the crank 20 at each revolution of the shaft, and the valve snaps shut after each operation through the action of the spring 21ª. The unit of dough drops into one of the cuplike containers, that has had the fat applied to the inner surface of the same, and is then ready for the application of the heat necessary to bake the same.

In order for the heat to be applied for a sufficient time to properly bake the container for the confection, several are required to be baked at one time. The baking elements give the best results if a low temperature is applied thereto, which permits them to remain in a baking position for a long period of time. This is accomplished by the arm 27 supporting the heated elements partially rotating with the table. The arm 27 supporting the baking elements is journaled on the column 2, by means of the band bearing 22ᵇ, parallel to the table 3, which is also journaled to the column by a band bearing 22ª. Lug 22 engages with detent 23 and carries the arm 27 around. The right angle catch 23ª located at the upper end of the detent engages with the slope 24 as it is carried around, and the detent is lifted from engagement with the lug. As the arm is carried around, tension is created within the spring 26, and when the detent has been lifted clear of the lug, the action of the spring 26, will return the arm to the starting position. The upper surface of the arm, through which the detent passes, and the bearing 25 hold the detent in alignment. The compression spring 28 maintains the detent in normal position, when the upper end of the same is not in engagement with the slope 24.

The baking elements are normally held out of baking position, and are depressed by means of the arm guide post 29, which is slidably mounted in bearings 30 and 31. The driving shaft 5 has a crank bend 32 therein for actuating the crank 33, which is pivoted about pin 34. The crank 33 is held in sliding relationship with the guide post 29 by the pin 35; and to provide for the arc of operation, a slot 36 is made in the outer end of the arm.

The baking element units are shown as six in number and are carried on the outer end of the arm 27. These heating elements are arranged to supply heat to a core to be inserted within the cup like containers, into which the dough has been deposited in an unbaked condition; and to supply heat to the outer diameter of the cuplike container as well. This serves to bake the interior and exterior surfaces of the confection container.

The hinged cups 7 are arranged in spaced relationship radially and equidistant from the common center. The cups are made of thin metallic material, permitting the heated element 41, which has an electric heating element 42 disposed between its inner and outer walls, to pass over and around the cup 7. The heated core 43, which has a heating element 44 therein, enters the cup 7, centrally of the same; and displaces the dough material, and causes the same to rise up and round the core. When the core descends it passes through the fat coated material 48ª, which coats the exterior surface thereof with fat. The springs 45 and 46 cause the return of the heated elements to an inoperative position when released. When the crank 5 actuates the lever 33, which carries the arm 48 down and the rollers 49 engage upon the surface 47 of the core; and as the arm 27 is carried around, as heretofore described, friction is partially eliminated by the rollers 49 engaging the surface 47. The lower surface of the roller engaging surface 47, contacts with the upper extremity of the spring 45 and compresses the same, and when the spring 45 has reached the limit of compression, the heater element 41 is depressed to an operative position.

When the guide post 29 is lowered sufficiently, the lock slide 37 is permitted to pass over the upper end of 29 and hold the same in depressed position. The locking slide is forced over by the action of compression spring 39. The heads of the rivets 38 maintain the slide in operative position. A flexible cable 40 is attached to the slide 37, and passes over pulley 41ª and is connected to the bell crank 42ᵇ mounted about pin 43ª. The guide post 29 is held depressed during the rotations of the arm and the bell crank about the column until the unsecured end of the bell crank engages with the stop 42ª, formed on bearing band 22ᵇ, which causes the release of the locking slide 37, and the guide post and heating members rise, due to the reaction of the compressed springs 45 and 46.

The construction and arrangement of the heating and baking elements are best shown in detail in Fig. 10 and Fig. 11. After the heating elements have been removed and the baking has been completed the baked product, then remaining within the cups, is passed through a cooling tunnel 50, after which the same are filled by my improved confection filling machine, the application for patent is filed concurrently with this application, Serial Number 714,597, filed May 20, 1924, now Patent No. 1,621,010, for confection filling machine. After the filling has been completed the filled containers yet remaining in the cups are again passed through a refrigerating tunnel 51, which may be cooled by the refrigerating pipes 52, or by other suitable means for accomplishing the desired result. When the cooled and filled cups and containers emerge from the cooling tunnel 51, the hinged cup containers encounter the deflector 53, which causes the hinged cup to tip from its upright position about the hinged side, and the completed confection 55 is deposited upon the incline 54, having been removed from the cup container by the dropping over of the container in a forcible manner and the action of gravity thereupon. After removal of the filled confection from the cup, the cuplike container is then returned to its upright position upon engaging the sloping side 56 of the incline.

Having thus described my invention I wish to make the following claims therefor—

1. In a confection making machine the combination of an intermittently revolving table, containers mounted upon said table, means discharging dough into said containers in rotation, horizontally rockable arms spaced above said table, said arms being provided with means which admit of their restricted rotation with said table, baking elements movably mounted at the outer extremities of said arms including means for lowering said baking elements about said containers, a heated core, within said baking elements insertible within said containers, other means to withdraw the baking elements from the containers, and means to eject the baked material from the containers.

2. In a confection making machine, the combination of a table intermittently revolving in a horizontal plane, containers mounted to said table to revolve therewith; a vertically shiftable oil reservoir mounted above the line of travel of said containers; said reservoir having a diametrically reduced lower portion provided with a plurality of perforations formed therethrough; a swab secured about said reduced portion and covering said perforations; and means to lower and raise said reservoir to cause said swab to engage with the inner surfaces of said containers.

3. In a confection making machine, the combination of a horizontally revolving table; containers hingably mounted to said table to revolve therewith, a vertically shiftable swab for supplying an oil coating to the interior surface of each container, means for partially filling each container with dough material; baking elements partially revolvable with said table and each slidable about an individual container, means to lower said baking elements each about an individual container; a core slidable within each baking element adapted to fit loosely within a container; means to disengage said baking elements and said cores from said containers; and means to consecutively rock said containers upon their hinges to allow the baked material therein to fall therefrom.

4. In a confection making machine, the combination of a horizontally revolvable table; containers rockably mounted to said table, means to coat the interior surface of each container with oil, means for partially filling each container with dough material; baking elements partially revolvable with said table and normally maintained in a position spaced above the line of travel of said containers; means to lower said baking elements each about an individual container; a slidable core carried by each baking element; means to maintain said core in a depressed position when its associate baking element is in a lowered position about a container; spring means to return said baking elements and their cores to inoperative position at a certain point in the revolution of said containers with said table; and means to rock said containers outwardly upon their hinges to eject the baked material therefrom.

5. The combination in a device wherein cup containers intermittently travel about a predetermined path, of means to apply oil to the interior surface of each cup, means to deposit a predeterminable amount of dough material into each cup; a carrier mounted above the line of travel of said cups; means allowing said carrier to travel with said cups; baking elements mounted to said carrier; means to lower certain baking elements about said cups; means to insert other making elements within said cups, means to withdraw all the baking elements from the cups, means to return the carrier to its original starting position; and means to partially invert the cups to eject the baked dough material therefrom.

6. In a confection making machine the combination of a horizontal table adapted for revolution in a horizontal plane, means to intermittently revolve said table, cups carried by said table, a vertically shiftable support situated at the outer edge and free of said table, an oil container mounted on said support and positioned above the line of travel of said cups; said container being provided with a lower repressed portion adapted to enter the aforesaid cups; a revolving shaft; a crank mounted to said shaft; a link connecting said crank to said vertically shiftable support; and means provided on said lower repressed portion of said container for applying oil to the interior surface of a cup when the oil container is lowered.

7. In a machine as claimed in claim 6, wherein the means for applying oil to the interior surfaces of the cups includes passageways formed through the walls of the lower repressed portion of said oil container communicating with the interior thereof; an annular jacket of absorbent material covering said passageways and said jacket to engage the walls of a cup when the oil container is depressed.

8. The combination in a device wherein containers travel about a predetermined course, of means to apply oil to the interior surface of each container, means to discharge dough material into each container, a carrier mounted above said containers; means allowing said carrier to travel with said containers; baking elements carried by said carrier; means to lower certain baking elements each about individual containers; means to insert other baking elements each within an individual container; other means withdrawing the aforesaid baking elements from the containers; and means returning the carrier after the baking elements are withdrawn from the containers to the point of commencement of its movement therewith.

CHARLES G. HALL.